United States Patent Office 2,951,292
Patented Sept. 6, 1960

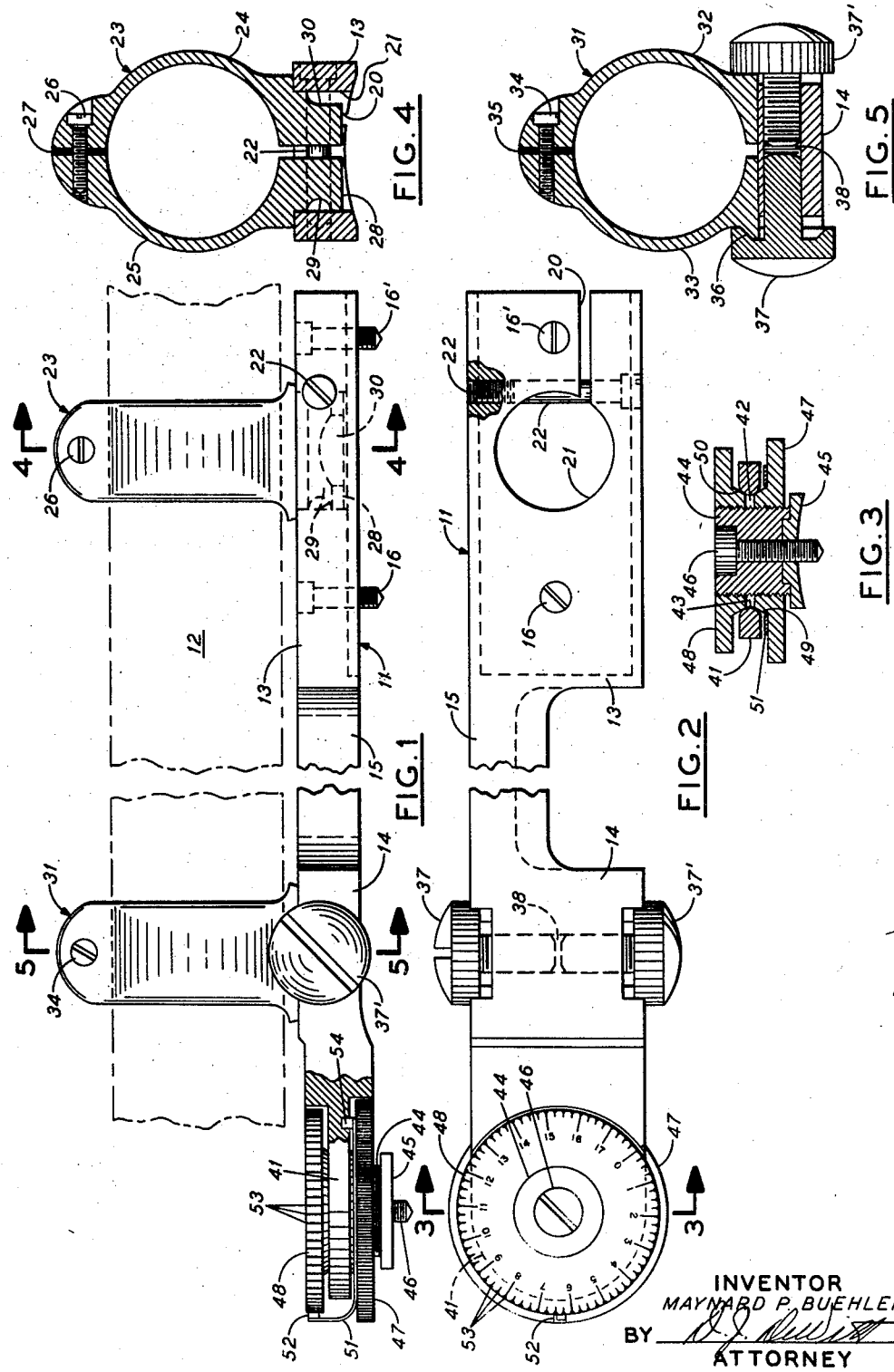
Sept. 6, 1960  M. P. BUEHLER  2,951,292
ADJUSTABLE TELESCOPE SIGHT MOUNT
Filed April 28, 1958
INVENTOR
MAYNARD P. BUEHLER
BY
ATTORNEY

2,951,292

ADJUSTABLE TELESCOPE SIGHT MOUNT

Maynard P. Buehler, 6 Great Oaks Circle, Orinda, Calif.

Filed Apr. 28, 1958, Ser. No. 731,162

5 Claims. (Cl. 33—50)

This invention relates to an adjustable telescope sight mount, and more particularly to a mount of this character which is adapted to support a telescope sight in selected positions of adjustment relative to the axis of the underlying gun barrel.

The primary object of this invention is to provide an improved telescopic sight mount which may be readily adjusted for windage and elevation under even the most adverse environmental conditions.

A more specific object is to provide a telescope sight mount which will permit the user of the gun to effect any given position of elevational adjustment and which will afford both a visual as well as an audial indication of the change in elevation so effected.

Another object is to provide a telescope mount which permits the user to effect elevational adjustment merely by turning a numbered dial (and its companion follower wheel) the number of dial segments known to correspond with the required elevational change, the turning of the dial past each segment being accompanied by a click providing the hunter with the audial signal required when light conditions make it difficult or impossible to read the dial.

Overall, an important object of this invention is to provide a telescope mounting structure which, once in place on the receiver, is firmly secured thereto and cannot be forced out of vertical alignment with the gun barrel even when making the changes in axial alignment which are incident to effecting a change in the elevational setting of the sight.

The nature of still other objects of this invention will be apparent from a consideration of the descriptive portion and the claims to follow, taken in conjunction with the figures of the drawing, wherein:

Fig. 1 is a side elevational view, in partial section, showing the mount of this invention ready to be screwed into place on the receiver of a rifle, a telescope supported on the mount being indicated in dotted outline;

Fig. 2 is a top plan view of the mount of Fig. 1, but without the telescope-enclosing rings;

Fig. 3 is a transverse sectional view on the line 3—3 of Fig. 2, showing the means for effecting elevational adjustment of the mount;

Fig. 4 is a transverse sectional view taken on the line 4—4 of Fig. 1, showing the forward telescope-enclosing ring; and Fig. 5 is a transverse sectional view taken on the line 5—5 of Fig. 1, showing the rear telescope-enclosing ring and means for adjusting the same transversely of the supporting plate to effect windage adjustment.

Referring to the drawings in detail, it will be noted that the reference numeral 11 has been applied generally to the elongated base plate of the mount used to support a telescope 12. Said plate has a front portion 13, a rear portion 14 and a connecting midportion 15 relieved to permit of flexure as the portion 14 is raised or lowered to effect elevational adjustment. The upper surface of plate 11 is flat, while the lower surface thereof (particularly that of front portion 13) is of concave configuration in order to seat closely against the adjacent surface of the receiver (not shown) as the mount is secured to the gun. The forward portion 13 is firmly secured to the receiver by means of screws 16 and 16', while the rear portion 14 is rigidly locked to the receiver in any desired position of elevational adjustment by means of the later-described assemblage particularly shown in Fig. 3.

Plate portion 13 is provided with an offset slot 20 and with a communicating central bore 21. A screw 22 extends through the slot and across a forward portion of the bore, thus providing an adjustable clamp within which to engage the annular base portion of a front telescope-enclosing ring 23. As particularly shown in Fig. 4, this ring is made up of opposed sections 24 and 25 held together at the top by screw 26, the joint so formed being provided with a laminated spacer 27 from which the individual laminations may be stripped as required to reduce the diameter of the closed ring to fit a given telescope.

The ring sections 24 and 25 are each provided with a depending, semicircular boss, said bosses collectively forming an annular base 28 having a peripheral groove 29. A small portion of said base is flattened at 30 to permit the base to be fitted into the bore 21 as said portion is aligned with the screw 22. As ring 23 is thereafter turned in the bore, screw 22 seats within groove 29 to hold the ring in place. It also serves as a fulcrum about which the ring may pivot as the rear portion of the telescope is raised or lowered to effect elevational adjustment, a function which remains substantially unimpaired even as screw 22 is turned to exert maximum clamping action on the base of the ring.

The rear portion of the telescope is secured to the plate portion 14 by means of a ring 31 made up of opposed sections 32 and 33 (Fig. 5) held at the top by a screw 34, the joint so formed also being provided with a laminated spacer 35 from which the individual laminations may be stripped to reduce the diameter of the ring. The bottom portion of each ring section is flattened to permit the ring to slide over the upper surface of plate 11, and each such portion is provided with an outwardly-extending, arcuate boss 36 so shaped as to engage the walls within the heads of screws 37 and 37' which are utilized in the conventional fashion to effect windage adjustment of the scope. As shown in Fig. 2, the head portions of screws 37, 37' fit within notches provided in the lateral surfaces of plate 11, while the shank portions thereof engage within a threaded bore 38 which extends between said notches. Thus, to move ring 31 across plate 11 for windage control, it is only necessary to loosen one or the other of the screws 37, 37' and to tighten the other in a corresponding amount.

The most rearward portion of plate 11 is relieved on both top and bottom surfaces to accommodate wheel, or nut members 47 and 48 which are utilized to effect elevational adjustment of the scope, leaving an extending, fin-like portion 41 (Fig. 3) which is provided with a central bore 42 having a radius-cut peripheral wall 43. An externally threaded stud 44 extends through the bore 42 and rests on a saddle 45, the adjacent surfaces of the stud and saddle being so contoured as to prevent lateral displacement therebetween, while the lower surface of the saddle is shaped to fit snugly against the receiver of the rifle. A screw 46 extends through a central bore provided in the stud and its supporting saddle, said screw acting in conjunction with screws 16 and 16' to secure the mount firmly to the receiver.

Turning upon the stud 44, and arranged to engage the lower surface of plate portion 41, is a follower wheel 47 having a diameter which is preferably somewhat greater than that of a dial wheel 48 similarly mounted on stud 44 and arranged for engagement with the upper surface of the intervening plate portion. Each of the wheels 47 and 48 is provided with an annular flange, as shown at 49 and 50, which extends about the periphery of the center hole and has the general appearance, in section of a truncated cone. The outer wall of each flange snugly engages that of bore 42, preferably at an angle of about 60° from the vertical, as the wheel bearing the same is tightened against the plate portion 41. This insures against lateral displacement of the rearward portion of plate 11 with reference to the vertical axis of the gun barrel or that of stud 44 even when one of the wheels 47, 48 is being turned away from the intervening plate portion.

Indicated at 51 is a generally O-shaped spring carrying an index finger 52 which engages notches 53 cut in the peripheral surface of wheel 48 and thus provides an audible click as the wheel is turned past each notch. The spring also carries a lock finger 54 which fits within an aperture in the lower surface of plate 41, thereby preventing the spring from revolving with the wheel 47.

Having described the structure of the mount, it will be seen that elevational adjustment thereof is made by forcing the sprung portions of plate 11 (i.e., those lying behind screw 16) in either an upward or a downward direction by turning the wheels 47, 48 upon the stud 44. The numbers shown atop wheel 48 reflect a calculated elevational change, as must also the notches 53 in the said wheel. Thus, each of the 18 numbered positions may correspond to 1 minute of angle and each notch to ¼ minute of angle, since the wheel contains 72 notches. If, when using a mount so calibrated, it is desired to raise the elevational sighting by 10 minutes, the upper wheel is turned counter-clockwise until the number 10 reaches the reference point which is adjacent the "0" mark in Fig. 2 (or until 40 "clicks" are heard), whereupon follower wheel 47 is also turned in a counter-clockwise direction until it may be turned no more, thus signifying the completion of the desired change.

The preferred method of using the mount, following the tightening of screws 16, 16' and 46 in the receiver and the setting in place of the telescope, is to bring the rear plate portion into the correct elevational position for shooting at a predetermined distance, usually 100 yards. Screw 46 is now loosened, thus permitting stud 44 and the wheels 47 and 48 to turn as a unit. Such a unit-turn is then made until the "0" on the dial reaches the reference point, whereupon screw 46 is again tightened. The user of the gun may now make any desired change from the "0" position merely by turning the wheels 47 and 48, the magnitude of any change so effected being indicated both visually as well as audibly.

While the figures of the drawing show a structure which provides an audible click only as the wheel 48 is turned to initiate elevational adjustment, it is also within the scope of this invention to provide a similar signal, or both a visual as well as an audial signal, in connection with one or both of the screw members 37, 37' used to effect lateral, or windage adjustment. Thus, the face of the screws can be calibrated and the edges thereof serrated, and a spring (anchored to a convenient portion of the plate 14) can be provided which will audibly signal the turn of the screws past each notch.

I claim:

1. In a telescope sight mount having an elongated relatively stiff base plate, a front telescope-enclosing ring having a base secured within a bore in a forward portion of the plate, a rear telescope-enclosing ring mounted for lateral adjustment on a rear portion of the plate, and means for securing the forward portion of the plate to the receiver of a gun, the improvement for effecting elevational adjustment by flexure of the rear plate portion, which comprises, in combination, an externally threaded stud provided with a central bore; a screw having a head portion and a threaded shank portion adapted to pass freely through the bore in said stud and to threadably engage the underlying receiver, thereby securing the stud against rotation and maintaining the same in a vertical position adjacent the rear portion of the plate; a lower wheel threaded on said stud and arranged to engage the lower surface of the plate; and an upper wheel threaded upon said stud and arranged to engage the upper surface of said plate, whereby rotation of both wheels in one direction flexes the intervening plate portion upwardly, while rotation of the wheels in the opposite direction lowers the said plate portion.

2. The apparatus of claim 1 wherein the stud extends through a bore provided in a rear portion of the base plate.

3. The apparatus of claim 1 wherein the stud extends through a radius-cut bore provided in a rear portion of the base plate and wherein each wheel surface adjacent the plate is provided with an annular flange, generally cone-shaped in section, which extends about the periphery of the threaded center hole in the wheel, the outer flange walls engaging that of the said bore as each wheel is tightened against the adjacent plate surface.

4. The apparatus of claim 3 wherein a saddle means having its under-surface shaped to that of the receiver is interposed between the receiver and the stud, wherein the adjacent surfaces of the stud and saddle are so fitted to one another as to prevent lateral displacement therebetween and to support the stud in a vertical position with reference to the receiver, and wherein the saddle is provided with a central bore aligned with that of the stud through which the receiver-engaging screw is also passed.

5. The apparatus of claim 3 wherein the top surface of the upper wheel bears numbered calibrations, wherein the outer margin of the wheel is provided with notches conforming to said calibrations, and wherein a spring finger, supported on the base, engages the notches and affords an audible click as each notch on the wheel is turned past said finger.

References Cited in the file of this patent

UNITED STATES PATENTS

| | | |
|---|---|---|
| 936,808 | Pedersen | Oct. 12, 1909 |
| 1,696,525 | Coolidge | Dec. 25, 1928 |
| 2,486,002 | Buehler | Oct. 25, 1949 |
| 2,702,947 | Dreier | Mar. 1, 1955 |